United States Patent Office 3,490,644
Patented Jan. 20, 1970

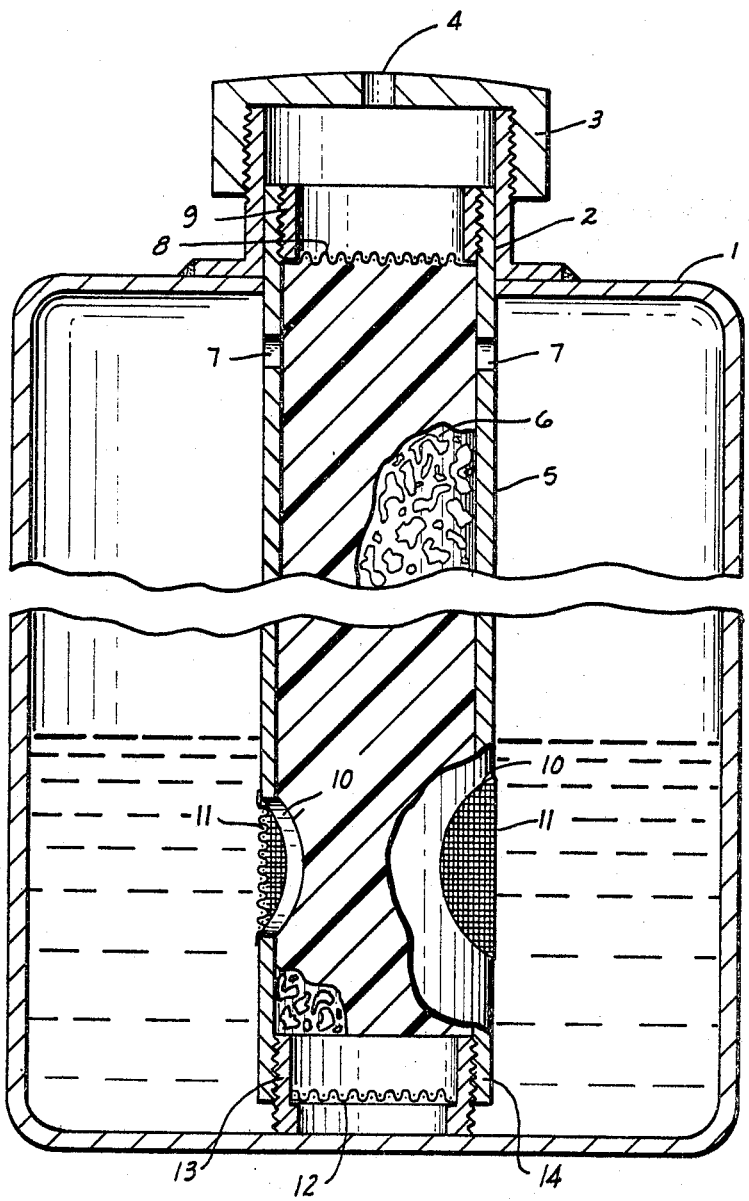

3,490,644
FUME ARRESTER
Max E. Redburn, Houston, Tex.
Filed Nov. 7, 1966, Ser. No. 596,379
Int. Cl. B01d 27/00
U.S. Cl. 220—88      1 Claim

ABSTRACT OF THE DISCLOSURE

This invention relates to a cartridge to be inserted in a tank, through the fluid inlet, having an open cell reticulated foam filler of solvent impervious material, which cartridge will act as a fume arrester, preventing fume escape from the tank opening during filling operations and preventing creation of fumes and vapors from turbulence during the filling operation.

---

This invention relates to new and useful improvements in a tank cartridge.

The background of the invention

In storage of volatile fuels and liquids, in small tanks or in large storage tanks such as are found on tank farms, considerable loss is suffered from fume and vapor escape during filling, and considerable danger is created by these fumes, both from combustion and from inhalation. It is an object of this invention to provide a means for reducing the danger in such instances, to be applicable to tanks presently in existance and to be included in the structure of new tanks.

Summary of the invention

It is an object of this invention to provide a fume arrester designed to prevent the vaporization of the liquid being stored and the creation of fumes during the filling operation of the tank.

Description of the drawings

FIGURE 1 is a side elevational view, in cross section, of a storage tank with the cartridge installed.

Description of the preferred embodiment

In the drawings, the numeral 1 designates a storage tank having a filler port 2 and a cap 3, within which is a ventilating opening 4. The cartridge herein described consists of the tubular housing 5 mounted within the part 2, and extending to the bottom of the tank 1. The cartridge is packed with open cell reticulated foam, such as polyurethane polyester 6, and the tubular housing is ventilated at 7, 7. A metal retaining screen 8 is mounted in the top of the housing 5 by means of the collar 9, and the discharge ports 10, 10 adjacent the bottom of the housing 5 are reinforced by metallic screen 11 welded, or otherwise secured to the housing 5 and covering the ports 10, 10.

A screen 12 is maintained in position by the externally threaded collar 13, mounted in the internally threaded areas 14 at the lowermost end of the housing 5. The collar 13 may be rotated to provide adjustment in the length of the housing 5 to fit the tank employed. The lower-most end of the collar 13 rests on the bottom of the tank 1.

Gasoline, or similar volatile fluids, are admitted into the tank 1 through the port 2 passing through the reticulated foam 6, and through the ports 10, 10 into the tank. Air may escape from the tank through the vent holes 7, 7 and 4, but the cell structure of the foam in the cartridge will cause condensation of the fumes within the tank moving into contact with the cartridge, and thus block escape of fumes from within the tank.

What I claim is:

1. In a fume arrester, a cartridge adapted to be mounted in the intake port of a storage tank for volatile fuels, said cartridge having a cylindrical housing mounted in said intake port, reticulated foam packed in said housing, ventilation opening adjacent the upper end of said cartridge, discharge ports adjacent the opposite end of said cartridge, screens mounted over said discharge ports, a screen mounted in said housing adjacent the upper end thereof, internal threads in said housing and an externally threaded collar mounted in said housing abutting aganst said screen, the opposing end of said housing having internal threads and an externally threaded collar mounted therein, and a screen mounted in said collar, said last mentioned collar seating on the bottom of said storage tank and being adjustable vertically therein.

References Cited

UNITED STATES PATENTS

| | | |
|---|---|---|
| 695,237 | 3/1902 | Scheuffgen. |
| 718,475 | 1/1903 | Kessler. |
| 1,266,665 | 5/1918 | Davis. |
| 1,553,395 | 9/1925 | Kessler et al. |
| 1,974,091 | 9/1934 | Wortmann. |
| 3,171,820 | 3/1965 | Voltz _____ 260—2.5 |

FOREIGN PATENTS

| | | |
|---|---|---|
| 856,407 | 3/1940 | France. |
| 1,052,912 | 3/1959 | Germany. |
| 61,878 | 10/1918 | Austria. |

RAPHAEL H. SCHWARTZ, Primary Examiner